A. R. GIBSON.
DUST PAN.
APPLICATION FILED DEC. 19, 1911.
1,055,265.
Patented Mar. 4, 1913.
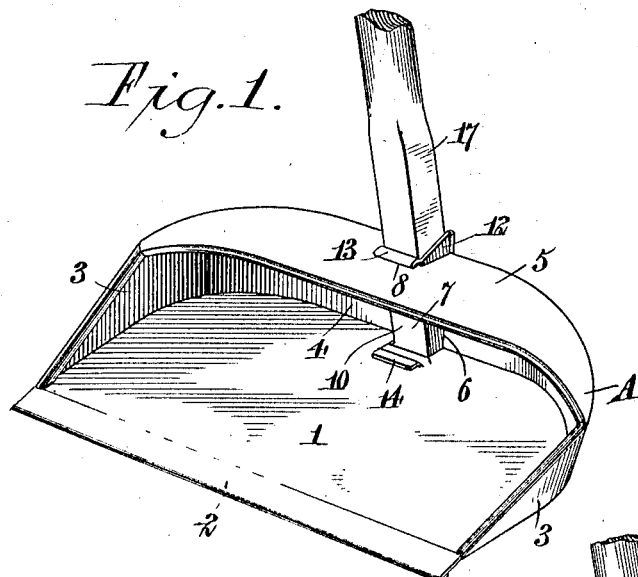
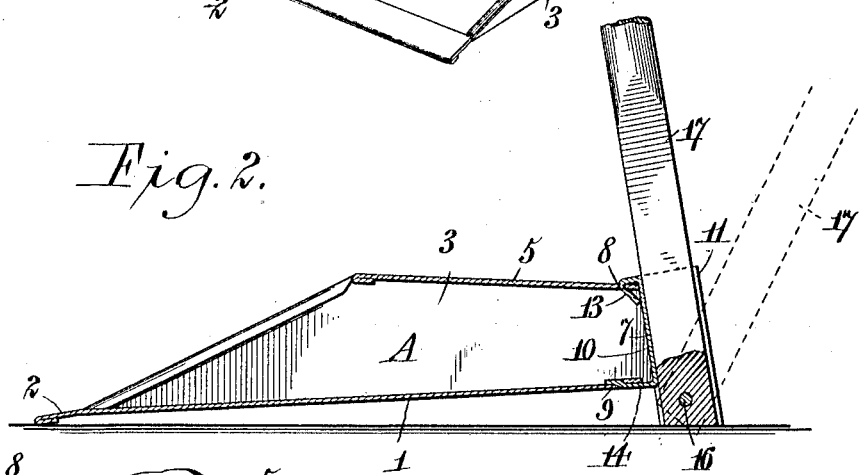
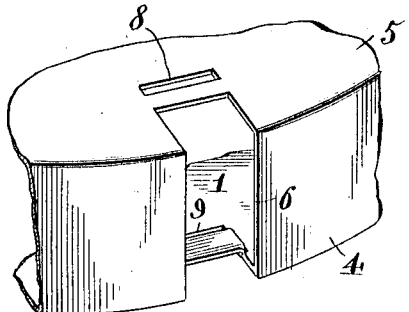
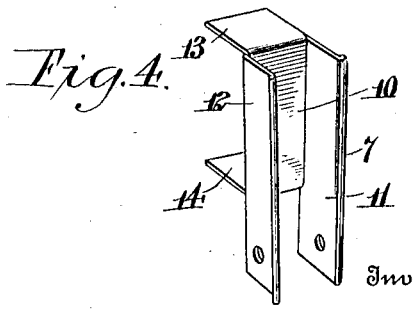
Inventor,
Adelbert R. Gibson.
By Victor J. Evans,
Attorney.
Witnesses:
Christ Feinle, Jr.
Wm. J. Koerth

UNITED STATES PATENT OFFICE.

ADELBERT R. GIBSON, OF LOS ANGELES, CALIFORNIA.

DUST-PAN.

1,055,265. Specification of Letters Patent. Patented Mar. 4, 1913.

Application filed December 19, 1911. Serial No. 666,659.

*To all whom it may concern:*

Be it known that I, ADELBERT R. GIBSON, a citizen of the United States, residing at Los Angeles, in the county of Los Angeles and State of California, have invented new and useful Improvements in Dust-Pans, of which the following is a specification.

The present invention relates to certain novel and useful improvements in dust pans. In carrying out my invention it is my purpose to provide a pan of the class described which will embody in its construction desired features of simplicity and efficiency coupled with economy in the cost of production and marketing.

A further object of my invention is to provide a pan having a clutch member which is secured thereon without the employment of solder, rivets, springs or the like, the said clutch adapted to have hingedly connected thereto a handle which is at all times frictionally contacted by the arms of the clutch, so that the said handle may be arranged in any desired position or angle, with relation to the pan to permit of the operating of the latter without necessitating the user stooping or bending toward the floor.

It is also my purpose to provide a dust pan wherein the frictional clutch, to which the handle is hingedly secured, has its lower extremity depending beyond the plane of the base, so that it is unnecessary to tilt the pan in sweeping the dust or dirt thereinto.

A further object of the present invention is to provide a dust pan with a hinged handle, the arrangement being such that the pan may be suspended from its handle, when not in use and swung upon the said handle to occupy a small space equaling only the thickness of the pan and handle, and furthermore provides means whereby the pan may be sustained or supported by the handle at an angle to the said handle to retain a certain amount of accumulated dust or dirt.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

In the drawing, Figure 1 is a perspective view of a pan constructed in accordance with the present invention. Fig. 2 is a transverse vertical sectional view taken through the pan proper and through the rear portion thereof to which the handle is hinged. Fig. 3 is a detail perspective view of the rear portion of the pan, the clutch handle sustaining member being removed. Fig. 4 is a detail perspective view of the clutch member.

Referring now to the drawing in detail the letter A indicates the dust pan proper, which may be of any suitable form, size, shape or dimensions and which may be constructed of any desired or preferred material. In the present instance the pan comprises a bottom 1 carrying a forward edge 2 which is beveled to form a lip, so that the edge will lie closely to or hug the floor or other surface being swept. The side walls of the pan are shown at 3—3, and merge in the usual manner in the rear vertical wall 4, the latter being covered by a hood or top 5, the rear of the pan, approximately central thereof is slotted as at 6 for the reception of a vertical sleeve or clutch member, the detail structure of which will be presently set forth. The opening is of a substantially rectangular formation, and the hood, 5, as well as the bottom 1 are each provided with rectangular slits or openings 8 and 9 respectively which are arranged adjacent the inner transverse walls provided by the opening.

The sleeve or clutch member 7 is constructed of a single strand of resilient material, and comprises a back or body 10, oppositely arranged out-turned walls 11 and 12. The upper portion of the body 10 is formed with an extension providing a lip 13 which is adapted to pass through the slot provided upon the top 5 and to be clenched or otherwise secured to the said top. It is, of course, to be understood that the rectangular sleeve or clutch member is of a thickness as well as a depth equaling that of the opening 6, and the lower extremity of the back 10 of the said clutch member is slitted to provide a second tongue 14 which is adapted to pass through the opening provided in the bottom of the pan and to be clenched or otherwise secured to the metal provided between the slotted portion of the bottom and the opening thereof. If desired, however, the said tongue 14 may be provided with an offset or stud which engages the wall formed by the slot in the bottom and which securely retains the sleeve or clutch member 7 upon the pan. The sides or arms of the sleeve or clutch member projecting below the lower lip are formed with registering openings the said openings being adapted to receive a pintle 16 whereby a handle 17 is hingedly connected with the sleeve. The arms of the sleeve or clutch member preferably have their outer extremities fluted, and the said arms are adapted to exert a pressure one toward the other, so that when the handle is arranged at an inclination to the pan and to the sleeve the arms of the said sleeve exerting a pressure upon the handle will effectively sustain the same at a desired angle. It will be noted by reference to the Figs. 1 and 2 of the drawings that the sleeve, as well as the handle extends a suitable distance below the bottom 1 of the pan, so that the lip of the pan is at all times sustained at an angle with relation to the back thereof, and whereby sweepings may be readily delivered to the body of the pan.

From the above description taken in connection with the accompanying drawings it will be noted that the handle may be swung upon its pivot and sustained at any desired angle with relation to the pan, and that the pan may be supported by the handle in a direct vertical plane with the said pan or that the pan may be sustained a suitable angle with relation to the handle, so as to retain a certain amount of accumulations or dirt, and retain the same in a suspended position until the device is again called into use. Furthermore it is to be understood that the clutch member or sleeve may be readily detached from the pan and the said member, together with its handle can be easily and quickly positioned upon any ordinary construction of dust pans by simply providing the dust pan with the opening and with the slits referred to in connection with the dust pan illustrated and described in this specification. It will be also noted that the cut-away portion of the dust pan is fully closed by the clutch sleeve and that the walls provided by the said cut-away portion serve as stops for the portions 11 and 12 of the said sleeve to contact with and limit the movement of the said portions 11 and 12 when the pivoted handle is rotated between the said portions 11 and 12 to frictionally engage therewith and spread the same.

Should it be found desirable to remove the clutch member or sleeve from the pan an outward pressure is exerted upon the lower portion of the said sleeve which will draw the tongue 14 through the opening 9, when an upward and forward movement of the clutch will force the bendable lip 13 through the opening 8, thus easily and quickly disengaging the clutch from the pan.

In the manufacture of the device, and upon placing the same on the market, the clutch and handle may be sold as a separate article from the pan, as the clutch may be readily and easily connected with ordinary hooded dust pans; in which instance the rear portion of the pan may have its solid handle removed, and provided with the slot and openings above described.

Having thus described the invention what I claim is:—

1. In combination with a hooded dust pan having a slotted rear portion and its hood and bottom provided with slits which are disposed adjacent the opening, of a handle carrying clutch, said clutch embodying a member having resilient arms which frictionally contact with the handle, and the said clutch being provided with extending tongues which are adapted to be inserted within the slits in the dust pan to retain the sleeve within the opening slot of the pan.

2. The herein described means for pivotally connecting a handle with a dust pan, embodying a substantially U-shaped sleeve, the side arms of which frictionally engage with the handle, the said sleeve being provided with extending tongues which are removably connected with the pan, and the lower tongue being disposed above the lower ends of the arms of the clutch.

3. A dust pan having its rear portion provided with a hood, the rear portion of the pan and the hood having a registering groove, the hood as well as the bottom of the pan being provided with transversely arranged slits disposed adjacent the groove, a clutch sleeve constructed of a single piece of resilient material and comprising a body provided with oppositely arranged outturned walls, the extremity of the walls being beaded, the body having its top as well as its lower portion above the lower edges of the sides integrally formed with rearwardly extending tongues, the clutch sleeve adapted to be arranged within the groove, the upper tongue adapted to be bent downwardly through the slit arranged in the hood and the lower tongue adapted to be inserted through the slit provided in the bottom, and a handle pivoted between the arms of the clutch sleeve.

4. In combination with a pan having its rear wall slotted, of a handle carrying clutch arranged within the slot to close the same, and connected with the pan, the said clutch including spaced resilient side members which are of a greater length than the rear portion of the pan, the said sides adapted to be pivotally connected with the handle and to frictionally engage the same.

In testimony whereof I affix my signature in presence of two witnesses.

ADELBERT R. GIBSON.

Witnesses:
 FLORENCE E. LEA,
 H. SCHULY.

Copies of this patent may be obtained for five cents each, by addressing the "Commissioner of Patents, Washington, D. C."